United States Patent
Schröder et al.

(10) Patent No.: US 8,753,177 B2
(45) Date of Patent: Jun. 17, 2014

(54) APPARATUS AND METHOD FOR REMOVING A SURFACE LAYER FROM A FOOD PRODUCT

(75) Inventors: Jens Schröder, Breidenbach (DE); Olaf Froese, Breidenbach (DE); Denny Hempel, Breidenbach (DE)

(73) Assignee: Weber Maschinenbau GmbH Breidenbach (DE)

( * ) Notice: Subject to any disclaimer, the term of this patent is extended or adjusted under 35 U.S.C. 154(b) by 189 days.

(21) Appl. No.: 13/363,882

(22) Filed: Feb. 1, 2012

(65) Prior Publication Data

US 2012/0192695 A1 Aug. 2, 2012

(30) Foreign Application Priority Data

Feb. 2, 2011 (DE) .......................... 10 2011 010 110

(51) Int. Cl.
*A22C 18/00* (2006.01)
(52) U.S. Cl.
USPC ........................................................ 452/134
(58) Field of Classification Search
USPC .................. 452/125, 127, 134, 156, 157, 158
See application file for complete search history.

(56) References Cited

U.S. PATENT DOCUMENTS

| | | | |
|---|---|---|---|
| 3,504,721 A | 4/1970 | Townsend | |
| 4,189,806 A * | 2/1980 | Van Heyningen | 452/134 |
| 4,246,837 A * | 1/1981 | Chenery | 452/134 |
| 4,998,323 A * | 3/1991 | Martin et al. | 452/125 |
| 5,090,939 A * | 2/1992 | Leblanc | 452/127 |
| 5,295,898 A * | 3/1994 | Andre et al. | 452/171 |
| 5,407,384 A * | 4/1995 | Boody et al. | 452/171 |
| 5,746,648 A * | 5/1998 | Boeyen et al. | 452/156 |
| 6,129,625 A * | 10/2000 | Cate et al. | 452/127 |
| 6,277,019 B1 * | 8/2001 | Veldkamp et al. | 452/134 |
| 6,547,658 B2 * | 4/2003 | Boody et al. | 452/171 |
| 6,558,242 B2 * | 5/2003 | Veldkamp et al. | 452/134 |
| 6,604,991 B1 | 8/2003 | Jurs et al. | |
| 6,929,540 B2 * | 8/2005 | Johnson et al. | 452/134 |
| 7,651,388 B2 * | 1/2010 | Faires et al. | 452/157 |
| 7,841,264 B2 * | 11/2010 | Kim et al. | 83/13 |
| 7,949,414 B2 * | 5/2011 | Blaine et al. | 700/29 |

(Continued)

FOREIGN PATENT DOCUMENTS

| | | |
|---|---|---|
| DE | 19834524 A1 | 2/2000 |
| DE | 19981456 B4 | 6/2006 |

(Continued)

OTHER PUBLICATIONS

German Search Report of German Application DE 102011010110.1; Filing Date Feb. 2, 2011; Mailing date Mar. 2, 2012, 6 pages and English Translation.

*Primary Examiner* — Richard Price, Jr.
(74) *Attorney, Agent, or Firm* — Cantor Colburn LLP

(57) ABSTRACT

An apparatus for removing a surface layer from food products includes a product feed which feeds a product to be processed along a product conveying direction to a removal tool. The product is pressed with a component perpendicular to the product conveying direction toward an operative surface of the removal tool. The relative position between the product feed and the removal tool is adjustable by means of an adjustment apparatus, with a control unit associated with the adjustment apparatus designed to adjust the position of the removal tool relative to the product feed in dependence on the contour of the product.

28 Claims, 3 Drawing Sheets

(56) References Cited

U.S. PATENT DOCUMENTS

| | | | |
|---|---|---|---|
| 8,025,000 B2 * | 9/2011 | Kim et al. | 83/13 |
| 8,166,856 B2 * | 5/2012 | Kim et al. | 83/13 |
| 2008/0245243 A1 | 10/2008 | Rusko et al. | |

FOREIGN PATENT DOCUMENTS

| | | |
|---|---|---|
| DE | 102005047752 B3 | 10/2006 |
| DE | WO2010139403 A1 | 12/2010 |
| WO | WO2004106020 A1 | 12/2004 |

* cited by examiner

APPARATUS AND METHOD FOR REMOVING A SURFACE LAYER FROM A FOOD PRODUCT

CROSS-REFERENCE TO RELATED APPLICATIONS

This patent application claims the benefit of priority to German Patent Application Serial No. 102011010110.1, filed Feb. 2, 2011, which is incorporated herein by reference in its entirety.

FIELD OF THE INVENTION

The present invention relates to an apparatus for removing a surface layer from food products having a product feed which feeds a product to be processed along a product conveying direction to a removal tool such that the product is pressed with a component perpendicular to the product conveying direction toward an operative surface of the removal tool.

BACKGROUND

Such apparatus are used in the food industry, for example, to separate the fat cover and/or the rind of a meat product from the quality meat. Depending on the purpose and on the kind of product, different tools such as rollers or knife blades are used for the removal, which are pressed toward the moving product transversely to the product conveying direction. It is necessary for a correct function of such a removal apparatus that the pressure of the removal tool onto the product surface is maintained during the total removal procedure.

Spring devices are therefore provided in conventional removal apparatus to pretension the removal tool toward the product surface. There is, however, the problem here that the spring force is dependent on the deflection of the spring device that is on the position of the removal tool relative to a base position, and the pressing force thus varies in the event of an irregular product thickness. This can have the result that the removal of the surface layer does not run ideally.

It is therefore a feature of the invention to ensure a uniform removal of the surface layer in an apparatus of the named kind also for products of irregular thickness.

The above referenced feature is provided by an apparatus for removing a surface layer from food products having a product feed which feeds a product to be processed along a product conveying direction to a removal tool. The product is pressed with a component perpendicular to the product conveying direction toward an operative surface of the removal tool.

In accordance with an embodiment of the invention, the position of the removal tool relative to the product feed is adjustable by means of an adjustment apparatus, with a control unit associated with the adjustment apparatus being designed to adjust the position of the removal tool relative to the product feed in dependence on the contour of the product. The pressing force can be varied as desired by the active adjustment of the relative position between the product feed—for example a product support surface—and the removal tool since said pressing force ultimately depends on the spacing between the operative surface of the removal tool and the corresponding counter-force which is associated with the product feed. In this respect, it does not play any role whether a spring device is additionally also provided for pressing on which is influenced in its deflection by the adjustment procedure or whether the relative position between the removal tool and the product feed is fixed, apart from the adjustment procedure, and the pressing force is ultimately based on the elasticity of the product. Depending on the application, the adjustment apparatus can move the removal tool itself or move a corresponding counter-surface of the product feed. The adjustment of the relative position can also take place in that both the removal tool and an associated counter-surface of the product feed are moved by the adjustment apparatus.

Provision is made in an embodiment that the relative position between a counter-surface of the product feed and the removal tool is adjustable.

Provision can furthermore be made that the counter-surface is formed at a pressing apparatus, with the pressing apparatus in particular including a pressing roller.

In accordance with a possible embodiment, the relative position is adjustable between a pressing apparatus and a product support surface of the product feed. In this respect, in particular the removal tool is arranged in a cut-out or recess of the product support surface.

Provision can furthermore be made that the product feed includes a pressing apparatus which is designed to press the product toward a product support surface of the product fed, with in particular the removal tool being arranged in a cut-out or recess of the product support surface.

In an embodiment, the removal tool may be arranged in a fixed position with respect to the adjustment direction relative to a product support surface of the product feed. This is, however, not compulsory. Alternatively, the removal tool can be adjustable with respect to the product support surface.

In an embodiment, the control unit may be designed to continuously adjust a counter-surface of the product feed and/or the operative surface of the removal tool to follow the contour of the product during the removal procedure. In other words, the adjustment apparatus guides the counter-surface or the removal tool continuously along the surface of the product during the removal procedure. The counter-surface or the removal tool therefore does not passively follow the product surface as with usual removal apparatus, but is rather actively guided along it. In this manner, an unchanging pressing force and thus an unchanging removal effect can be achieved during the total removal procedure. The counter-surface is in particular formed at a pressing apparatus, e.g. at a pressing roller, which can be driven and thus can also serve as a conveying roller or it can be not driven and can be freely rotatable.

In accordance with an embodiment, the spacing of a counter-surface of the product feed and/or of the operative surface of the removal tool from a product support surface of the product feed can be adjusted by means of the adjustment apparatus. The product support surface can e.g. be the surface of a belt conveyor which simultaneously also serves for the product advance. Alternatively, a static product support surface could also be provided.

Furthermore, a detection device for determining the contour of the product can be provided which is connected to the control unit and which in particular works in a contactless manner. The control unit is thus able to carry out the position adjustment with reference to the specifically measured contour of the product just to be processed, whereby a particularly exact following adjustment of a counter-surface and/or of the removal tool can be achieved.

The detection device can include at least one distance measuring sensor, in particular an ultrasound based sensor. A reliable determination of the product contour is hereby possible without piercing or cutting into the product or otherwise damaging it.

A contactless distance detection can take place in an optical manner in accordance with an embodiment of the invention. An optical detection device can be provided, for example which is based on the triangulation principle or on the light sectioning process. In particular, at least one line projector with a laser as a light source can be used in conjunction with at least one camera for observing the projected line on the product in order thus to determine the product contour by the line offset. A further possibility for contactless contour detection is the use of an X-ray scanner which is able to determine the inner structure of a product using density differences. The portion of the structure information related to the outer contour can be extracted from this exhaustive structure information. The use of an X-ray scanner is in particular suitable with applications in which the inner structure of the product anyway has to be determined—for example to observe an exact product portion weight.

It is generally also conceivable, in accordance with an independent aspect, to press the product toward a product support surface from above, e.g. by means of a pressing roller or a conveying roller, with a knife blade which is vertically adjustable in dependence on the contour removing a lower surface layer of the product while the product is conveyed in the direction of the knife blade.

In accordance with an embodiment, the removal tool comes into enragement with the product surface from below in order thus to remove a lower surface layer of the product. In this case, gravity can assist or even completely provide the pressing force. The removal tool can be positioned in a cut-out or recess of the corresponding product support surface for this purpose. Depending on the application, the lower removal tool can in this respect be vertically adjustable or an upper counter-surface, e.g. a top section of the product feed, can be adjusted in dependence on the product contour with a fixed-position removal tool. In principle in accordance with the invention, at least two removal tools can be provided which can be adjusted in dependence on the contour and which are operative at oppositely disposed product sides.

In accordance with an embodiment, the removal tool includes a tool for defatting, skinning and/or derinding. The invention allows a particularly effective cutting of the rind and/or of the fat cover of a meat product from the quality meat component lying thereunder by providing an unchanging pressing force.

In accordance with an embodiment, the removal tool includes at least one roller rotatable about an axis of rotation extending transversely to the product conveying direction. In such an embodiment, fat is removed, for example, in that it is led through a restriction between the rotatable roller and a support surface of a product conveyor. The pressing force with which the roller is pressed toward the product surface is in this respect predefined by the height of the restriction. The pressing force can be reduced as required by increasing this height by means of a positional adjustment of the roller. The roller can have a ribbing such as is known in the field of defatting machines. The roller can alternatively be a pressing roller which presses the product toward a product support surface in which the removal tool is arranged.

In accordance with an embodiment, the removal tool includes at least one knife or a blade, with a conveying device preferably formed as a roller in particular being disposed before the knife or the blade in the product conveying direction.

The knife or the blade may be arranged in a recess or cut-out of the product support surface, in particular together with the additional conveying device preferably formed as a feed roller. The knife or blade and the feed roller are consequently located beneath the product and the feed roller serves to feed the surface layer to be removed to the cutting edge of the knife or blade safely and reliably. The knife or the blade and optionally also the feed roller can be adjustable, with, however, this preferably only taking place in the sense of a one-time machine setting for the respective product and having nothing to do with the adjustment in dependence on the product contour in accordance with the invention.

The knife or the blade can be provided with an apparatus which serves to deflect the cut-off surface layer, e.g. a rind, downwardly, e.g. into a collection container.

The adjustment apparatus may include a motorized actuating drive. A sufficiently fast and reliable following adjustment of the removal tool and/or of a counter surface of the product feed can hereby be ensured.

The actuating drive can in particular include a controllable electric motor by means of which a fast and exact positional adjustment can be achieved.

In accordance with a further embodiment of the invention, a pressing apparatus of the product feed and/or the removal tool is attached to a pivot arm, with the pressing apparatus and/or the removal tool being able to be raised and lowered with respect to a product support surface of the product feed by means of the adjustment apparatus. The pivot arm can in this respect form a lever for amplifying the adjustment force.

The adjustment apparatus can be designed to adjust the relative position between the product feed and the removal tool furthermore in dependence on a quality of the product. It can, for example, be desirable to predefine different pressing forces for different types of product. The removal quality can thus be further optimized.

The removal tool can generally be adjusted relative to a support surface or support plane for the product or relative to a counter-surface located above the support surface, e.g. formed at a pressing apparatus, with it not playing any role whether the removal tool, the support surface or the counter-surface or both components are moved, i.e. it is, for example, also possible to adjust the support surface or the counter-surface in the vertical direction in dependence on the contour and so to press the product toward a removal tool fixed in the vertical direction by means of the adjustable support surface.

The invention furthermore relates to a method for removing a surface layer from food products, wherein a contour of a product to be processed is determined, the product is fed along a product conveying direction to a removal tool such that the product is pressed with a component perpendicular to the product conveying direction toward an operative surface of the removal tool and the relative position between the product feed and the removal tool is adjusted in dependence on the determined contour of the product by means of an adjustment apparatus.

The position of a pressing apparatus of the product feed can in particular be adjusted to follow the contour of the product during the removal procedure.

In accordance with an embodiment, the contour of the total product is determined before the start of the removal procedure. This can in particular be advantageous if the product contour anyway has to be determined for other purposes.

Alternatively, the contour of the product can also be determined point-wise or section-wise during the removal procedure. Such a contour detection "on the fly" can be advantageous for specific applications.

The invention will be described in the following by way of example with reference to the drawings.

DETAILED DESCRIPTION

Figure 1:
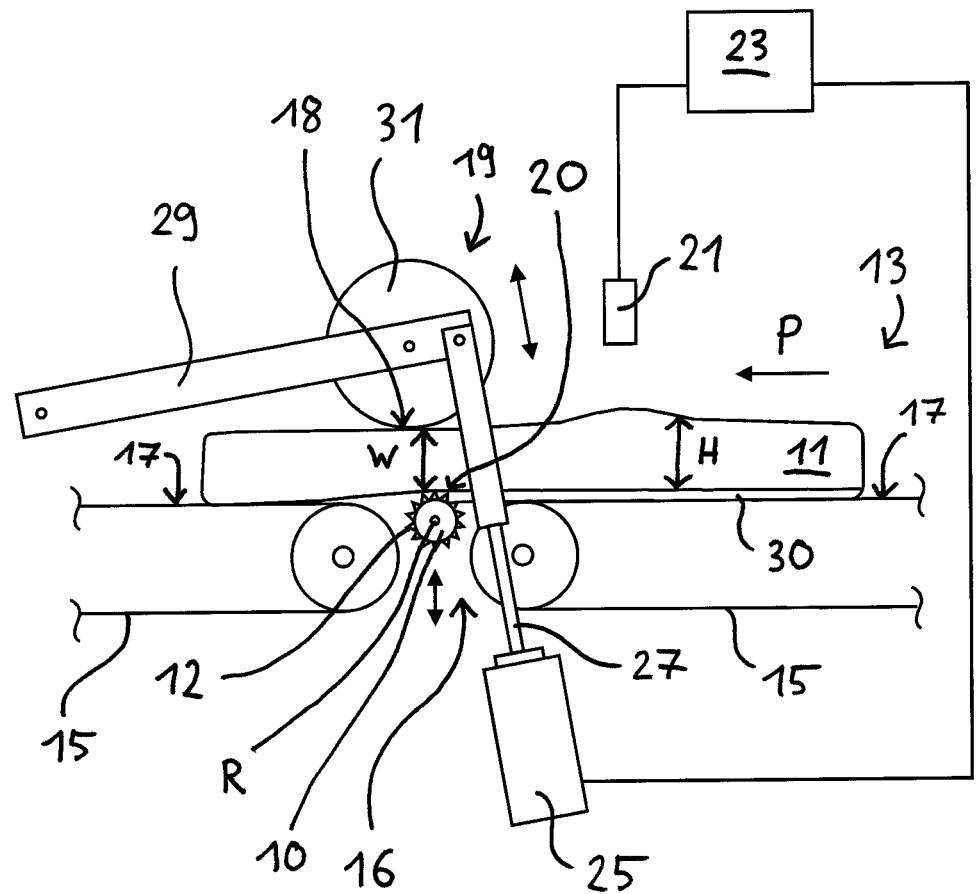
FIG. 1 shows a simplified side view of an apparatus for removing a surface layer from food products in accordance with one embodiment of the invention.

In accordance with FIG. 1, a derinding machine or defatting machine for meat products includes a removal roller 10 by means of which a surface layer 30 such as a fat cover can be removed from a meat product 11. The removal roller 10 has a toothed arrangement 12 for this purpose. The removal roller 10 can e.g. include a plurality of disks which are arranged next to one another along an axis of rotation R of the removal roll 10 and at whose circumference teeth are respectively formed.

A product feed 13 serves to feed the meat product 11 along a product conveying direction P to the removal roller 10. The product feed 13 includes two driven belt conveyors 15 which are arranged behind one another and on which the meat product 11 lies. Alternatively or in addition to the belt conveyors 15, further mechanisms can be provided for effecting the product advance. The removal roller 10 is rotatable about the axis of rotation R extending at a right angle to the product feed direction P and is arranged in a recess 16 between the two belt conveyors 15. The removal roller 10 can thereby come into engagement with the lower side of the meat product 11. To be able to remove surface layers 30 of different thickness from the lower side of the meat product 11, the removal roller 10 is vertically adjustable relative to the support surfaces 17 of the belt conveyors 15 located in a common plane, which is illustrated by a double arrow in FIG. 1. This vertical setting preferably takes place before the actual removal procedure, i.e. with respect to the height the removal roller 10 is arranged in a fixed position relative to the support surfaces during the removal procedure. Provision can alternatively be made that the removal roller 10 is also vertically adjustable during the removal procedure and indeed with respect to or in dependence on the contour of the product 11. In the embodiment described here, it is, however, a counter-surface of the product feed which will be described in more detail in the following and which is adjustable relative to the fixed removal roller 10 in dependence on the product contour.

The product feed 13 furthermore includes a pressing apparatus in the form of a pressing roller 31 which preferably has a ribbing not shown in FIG. 1. The pressing roller 31 presses the meat product 11 downwardly with a counter-surface 18 on the product side toward the support surfaces 17 of the belt conveyors 15 and toward an operative surface 20 of the removal roller 10 at the product side. Since the pressing roller 31 is rotatably driven about an axis of rotation extending parallel to the axis of rotation R of the removal roller 10, it also forms a conveying roller for assisting the product advance. Such a conveying function is, however, not compulsory for the pressing roller 31, i.e. the pressing roller 31 also forms an element of the product feed 13 as a component not providing the advance of the product 11.

In the course of the transport on the belt conveyors 15, the meat product 11 moves between the pressing roller 31 and the removal roller 10 so that the meat product 11 is pressed with a component perpendicular to the product conveying direction P toward the removal roller 10. The force with which the removal roller 10 presses toward the lower side of the meat product 11 or with which the product 11 is pressed toward the removal roller 10 by means of the pressing roller 31 depends on the ratio between the product height H and the clearance W between the removal roller 10 and the pressing roller 31, i.e. between the operative surface 20 of the removal roller 10 and the counter surface 18 of the pressing roller 31.

As can be seen from FIG. 1, the meat product 11 has an irregular contour so that the product height H and consequently the pressing force of the removal roller 10 would vary during the removal procedure without further measures.

In order nevertheless to ensure an unchanging pressing force during the total removal procedure, an adjustment apparatus 19 is provided by means of which the pressing roller 31 can be actively raised and lowered in order thus actively to vary its spacing from the removal roller 10 in dependence on the product contour.

To determine the contour of the meat product 11, an ultrasound sensor 21 is provided which continuously detects the distance from the product surface and transmits it to an electronic control unit 23. The control unit 23 controls a motorized actuating drive 25, which can be a servo motor for example, in dependence on the received distance signal. An actuating piston 27 which engages at an end of a pivot arm 29 at which the pressing roller 31 is supported can be moved out and in by means of the actuating drive 25. The pivot arm 29 is pivotably supported at its other end at a fixed-position reference point of the product feed 13, which is not shown in detail in FIG. 1. The pivot arm 29 can be upwardly pivoted by a moving out of the actuating piston 27, whereby the pressing roller 31 is raised with respect to the support surfaces 17 and the removal roller 10. Conversely, the pivot arm 29 can be downwardly pivoted by moving in the actuating piston 27, whereby the pressing roller 31 is lowered with respect to the support surfaces 17.

The control unit 23 regulates the actuating drive 25 such that the pressing roller 31 is continuously adjusted to follow the contour of the meat product 11 during the total removal procedure, that is it is actively guided along the upper side of the meat product 11. An unchanging pressing force and thus an unchanging quality of the removal taking place by means of the removal roller 10 can be maintained by this active following adjustment of the pressing roller 31 despite an irregular product contour. It results as a further advantage of the controlled following adjustment that apart from the following adjustment process the base value of the pressing force of the removal roller 10 can also be varied as required in order thus, for example, to take account of a different thickness or consistence of different meat products 11.

Figure 1A:
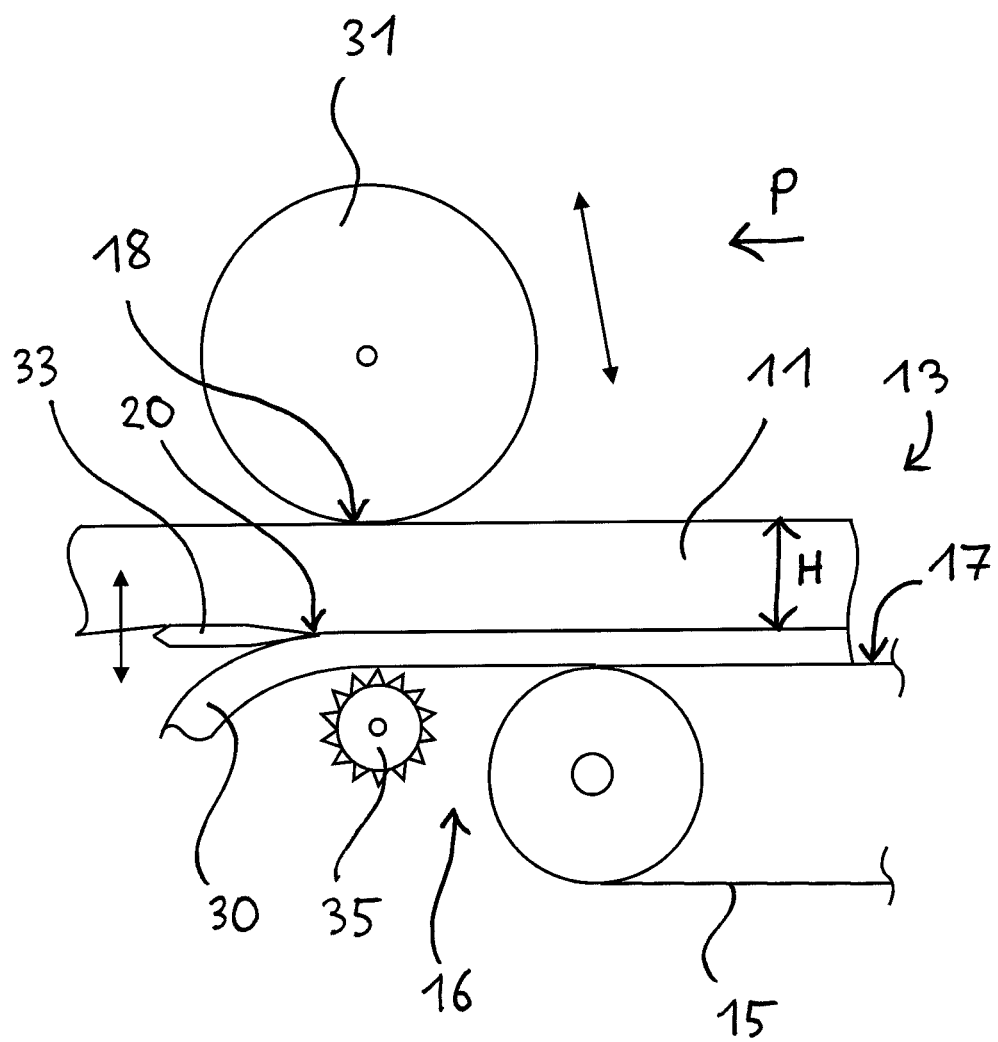
FIG. 1a shows a simplified side view of an apparatus for removing a surface layer from food products in accordance with another embodiment of the invention.

Another embodiment of the invention shown in FIG. 1a provides that instead of a rotating removal roller a knife or a blade 33 is used for derinding or defatting a meat product 11. To drive the meat product 11 safely and reliably toward the blade 33, in addition to the belt conveyors 15—of which only one is shown in FIG. 1a—a conveyor device 35 in the form of a feed roller can be provided which is situated directly in front of the blade 33 in the product conveying direction P.

The arrangement of blade 33 and feed roller 35 is, like the removal roller shown in FIG. 1, arranged in a recess 16 between the two belt conveyors 15 so that the blade 33 and the feed roller 35 are therefore located beneath the meat product 11. To be able to remove surface layers 30 of different thickness from the lower side of the meat product 11, the blade 33 is vertically adjustable relative to the support surfaces 17 of the belt conveyors 15, which is illustrated by a double arrow in FIG. 1a. If the application should require, the feed roller 35 can also be vertically adjustable.

The blade 33 cuts the surface layer 30 from the meat product 11. In this respect, the blade 33 remains substantially in a fixed position, i.e. no rotational movement takes place as in the removal roller 10 in accordance with FIG. 1. If it should be necessary due to the application, however, a vertical adjustment of the blade 33 could take place during the operation of the defatting machine. Such a vertical adjustment of the blade 33 is, however, not decisive for the setting of the pressing force. The cut-off surface layer 30 moves downwardly into a suitable collection container, not shown, with an apparatus being able to be arranged in the region of the blade 33 which assists the downward deflection of the cut-off surface layer 30.

A pressing roller 31 presses the meat product 11 downward toward the blade 33 and the feed roller 35 by a counter-surface 18 at the product side in an analogous manner to the embodiment in accordance with FIG. 1. The pressing roller 31 is in turn continuously adjusted to follow the contour of the meat product 11 during the total removal procedure to ensure an unchanging pressing force during the total removal procedure. The adjustment of the pressing roller 31 takes place in this respect in the same manner as in the apparatus in accordance with FIG. 1, with the adjustment apparatus being omitted in FIG. 1a for simplification.

Figure 2:
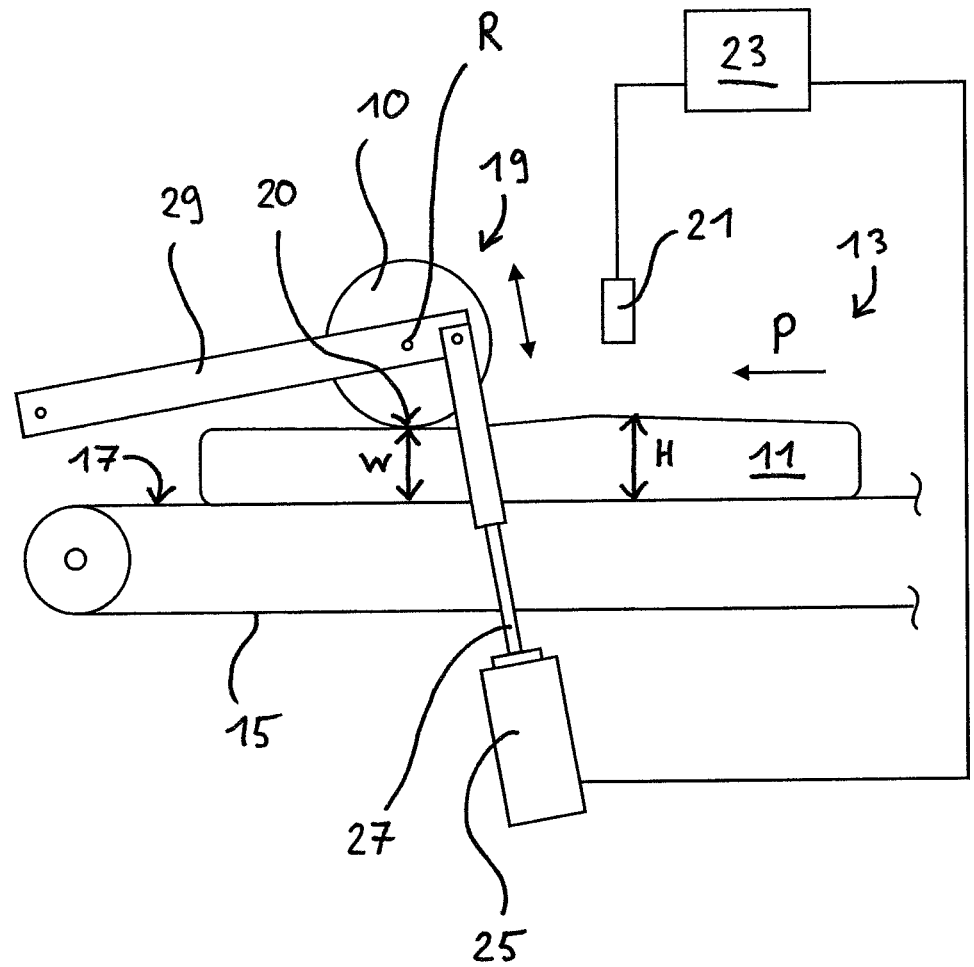
FIG. 2 shows a simplified side view of an apparatus for removing a surface layer from food products in accordance with yet another embodiment of the invention.

In accordance with the further embodiment shown in FIG. 2 a defatting machine for meat products includes a removal roller 10 which is arranged above the support surface 17 for the meat product 11. The removal roller 10 can have a suitable ribbing, which is not shown in FIG. 2. A product feed 13 serves to feed the meat product 11 along a product conveying direction P to the removal roller 10. The product feed 13 for this purpose includes a driven belt conveyor 15 on which the meat product 11 lies. Alternatively or in addition to the belt conveyor 15, further mechanisms can be provided for effecting the product advance. The removal roller 10 is rotatable about an axis of rotation R extending at a right angle to the product conveying direction P.

In the course of the transport on the belt conveyor 15, the meat product 11 moves between the pressing surface 17 of the belt conveyor 15 and the removal roller 10 so that the meat product 11 is pressed with a component perpendicular to the product conveying direction toward the removal roller 10. The force with which the removal roller 10 presses toward the upper side of the meat product 11 depends on the relationship between the product height H and the clearance W between the removal roller 10 and the support surface 17. As can be seen from FIG. 2, the meat product 11 has an irregular contour so that the product height H and consequently the pressing force of the removal roller 10 would vary during the removal procedure without further measures.

In order nevertheless to ensure an unchanging pressing force during the total removal procedure, an adjustment apparatus 19 is provided by means of which the removal roller 10 can be actively raised and lowered in order thus actively to vary the spacing between the operative surface 20 of the removal roller 10 at the product side and the support surface 17 of the belt conveyor 15 in dependence on the product contour. To determine the contour of the meat product 11, an ultrasound sensor 21 is provided which continuously detects the distance from the product surface and transmits it to an electronic control unit 23. The control unit 23 controls a motorized actuating drive 25, which can be a servo motor for example, in dependence on the received distance signal. An actuating piston 27 which engages at an end of a pivot arm 29 at which the pressing roller 10 is supported can be moved out and in by means of the actuating drive 25. The pivot arm 29 is pivotably supported at its other end at a fixed-position reference point of the product feed 13, which is not shown in detail in FIG. 2. The pivot arm 29 can be upwardly pivoted by a moving out of the actuating piston 27, whereby the removal roller 10 is raised with respect to the support surface 17. Conversely, the pivot arm 29 can be downwardly pivoted by moving in the actuating piston 27, whereby the removal roller 10 is lowered with respect to the support surfaces 17. The control unit 23 regulates the actuating drive 25 such that the removal roller 10 is continuously adjusted to follow the contour of the meat product 11 during the total removal procedure, that is it is actively guided along the upper side of the meat product 11. An unchanging pressing force and thus an unchanging quality of the removal can be maintained by this active following adjustment of the removal roller 10 despite an irregular product contour. It results as a further advantage of the controlled following adjustment that apart from the following adjustment process the base value of the pressing force of the removal roller 10 can also be varied as required in order thus, for example, to take account of a different thickness or consistence of different meat products 11.

In all embodiments shown, the ultrasound sensor 21 detects the contour of the meat product 11 in a point-wise or line-wise manner in front of the removal roller 10 viewed in the product conveying direction P. Alternatively, a contour detection device could also be provided which determines the contour of the total meat product 11 before the start of the removal procedure. Such a contour detection device could also be arranged at a different position of the defatting machine or the defatting machine could be part of a larger production line and can receive the contour data from another apparatus.

As already initially mentioned, the distance detection can alternatively take place in an optical manner. An optical detection device can be provided, for example which is based on the triangulation principle or on the light sectioning process. In particular at least one line projector—preferably with a laser as a light source—can be used in conjunction with at least one camera for observing the projected lines on the product in order thus to determine the product contour by the line offset. A further possibility for contactless contour detection is the use of an X-ray scanner which is able to determine the inner structure of a product using density differences. The portion of the structure information related to the outer contour can be extracted from this exhaustive structure information.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for removing a surface layer from food products comprising:
    a product feed which feeds a product to be processed along a product conveying direction to a removal tool, such that the product is pressed with a component perpendicular to the product conveying direction toward an operative surface of the removal tool; and
    an adjustment apparatus for adjusting the relative position between the product feed and the removal tool, there being a control unit associated with the adjustment apparatus, the control unit being designed to adjust the relative position between the product feed and the removal tool in dependence on a contour of the product.

2. The apparatus of claim 1, wherein a relative position between a counter-surface of the product feed and the removal tool is adjustable.

3. The apparatus of claim 2, wherein the counter-surface is formed at a pressing apparatus.

4. The apparatus of claim 3, wherein the pressing apparatus includes a pressing roller.

5. The apparatus of claim 1, wherein a relative position between a pressing apparatus and a product support surface of the product feed is adjustable.

6. The apparatus of claim 5, wherein the product support surface inclues one of a cut-out portion and a recess portion and the removal tool is arranged in the one of a cut-out portion and a recess portion.

7. The apparatus of claim 1, wherein the product feed includes a pressing apparatus designed to press the product toward a product support surface of the product feed.

8. The apparatus of claim 7, wherein the removal tool being arranged in one of a cut-out portion and a recess portion of the product support surface.

9. The apparatus of claim 1, wherein the removal tool is arranged in a fixed position with respect to an adjustment direction relative to a product support surface of the product feed.

10. The apparatus of claim 1, wherein the control unit is designed to continuously adjust a counter surface of the product feed to follow a contour of the product during the removal procedure.

11. The apparatus of claim 1, wherein a detection device is connected to the control unit.

12. The apparatus of claim 11, wherein the detection device operates in a contact-free manner for determining the contour of the product.

13. The apparatus of claim 11, wherein the detection device includes at least one distance measuring sensor.

14. The apparatus of claim 13, wherein said distance measuring sensor is an ultrasound-based sensor.

15. The apparatus of claim 1, wherein the removal tool includes a tool for at least one of defatting, skinning and derinding said product.

16. The apparatus of claim 1, wherein the removal tool includes at least one roller rotatable about an axis of rotation extending transversely to the product conveying direction.

17. The apparatus of claim 1, wherein the removal tool includes at least one of a knife and a blade.

18. The apparatus of claim 1, wherein a conveying device is situated in front of the knife or of the blade when viewed in the product conveying direction.

19. The apparatus of claim 18, wherein said conveying device is formed as a roller.

20. The apparatus of claim 1, wherein the adjustment apparatus includes a motorized actuating drive.

21. The apparatus of claim 20, wherein the motorized actuating drive includes a controllable electric motor.

22. The apparatus of claim 1, wherein a pressing apparatus of the product feed is attached to a pivot arm, with the pressing apparatus being able to be raised and lowered with respect to a product support surface of the product feed by a pivoting of the pivot arm with the adjustment apparatus.

23. The apparatus of claim 1, wherein the adjustment apparatus is additionally designed to adjust the relative position between the product feed and the removal tool in dependence on a quality of the product.

24. A method for removing a surface layer from food products comprising:
   determining a contour of a product to be processed;
   feeding the product along a product conveying direction to a removal tool such that the product is pressed with a component perpendicular to the product conveying direction toward an operative surface of the removal tool; and
   adjusting the relative position between a product feed, and the removal tool by an adjustment apparatus in dependence on the determined contour of the product.

25. The method of claim 24, wherein said product feed comprises a pressing apparatus and the method includes the step of adjusting the relative position between the pressing apparatus and the removal tool.

26. The method of claim 24, wherein the position of a pressing apparatus of the product feed is adjusted to follow the contour of the product during the removal procedure.

27. The method of claim 24, wherein the contour of the total product is determined before a start of the removal procedure.

28. The method of claim 24, wherein the contour of the product is determined one of point-wise and section-wise during the removal procedure.

* * * * *